March 30, 1943.   C. N. TINGLEY ET AL   2,315,463
ARCHITECTURAL MODEL
Filed March 24, 1942   3 Sheets-Sheet 1

INVENTORS
Clark N. Tingley
Floyd K. Harper
BY Leech & Radue
ATTORNEYS

March 30, 1943. C. N. TINGLEY ET AL 2,315,463
ARCHITECTURAL MODEL
Filed March 24, 1942 3 Sheets-Sheet 2

INVENTORS
Clark N. Tingley
Floyd K. Harper
BY Leech & Radue
ATTORNEYS

March 30, 1943.  C. N. TINGLEY ET AL  2,315,463
ARCHITECTURAL MODEL
Filed March 24, 1942  3 Sheets-Sheet 3
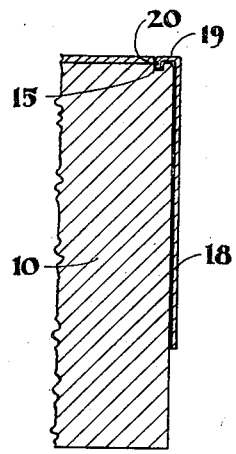
FIG. 7
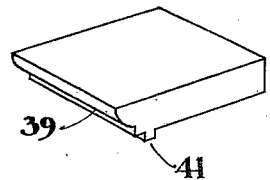
FIG. 8
FIG. 9
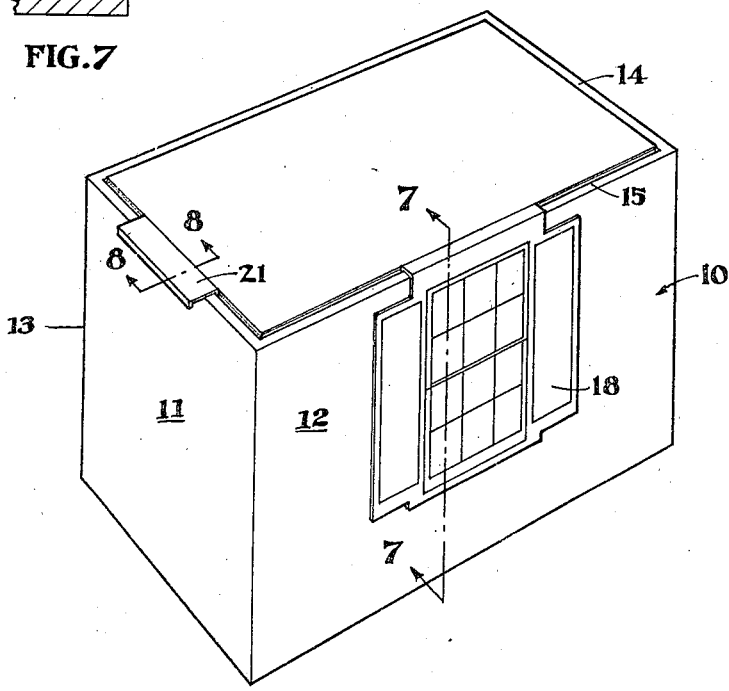
FIG. 6
INVENTORS
Clark N. Tingley
BY Floyd K. Harper
Leech & Radue
ATTORNEYS Patented Mar. 30, 1943

2,315,463

UNITED STATES PATENT OFFICE 2,315,463

ARCHITECTURAL MODEL

Clark N. Tingley, Johnson City, and Floyd K. Harper, Binghamton, N. Y.

Application March 24, 1942, Serial No. 436,034

9 Claims. (Cl. 35—16)

The present invention concerns architectural models, and particularly the provision of means for designing and constructing a scale model of a building such as a house, office building, club, cottage or the like including supplemental buildings and accessories. It is an object of the invention to provide a flexible, model construction set with interchangeable units which will enable anyone to construct a desired style and design of building to scale.

It is also an object of the invention to provide a building set with which prospective home owners may construct a variety of experimental scale models. The provision of a number of standard units scaled to multiples of a base module facilitates shifting the units around so that virtually any combination may be obtained. In this way, the completed structure may be readily visualized and altered to suit the needs or taste of the designer.

A further object of the invention is to provide a simple inexpensive building set with which the average home planner without architectural knowledge or ability to visualize in three dimensions can obtain a clear and complete understanding of what he wants for a dwelling or other building, or what is almost as important, a concrete idea of the home his architect has designed for him. So often an inability to visualize in three dimensions causes misunderstanding with the result that the prospective owner has no real conception of the house designed for him until after construction has proceeded to such an extent that changes are most expensive if not out of the question.

One of the specific purposes of the invention is to provide representations of doors, windows and the like so formed and arranged as to be placed where desired on exterior walls of the model and to represent such details in plan as well as elevation. The doors and windows are slidable relative to the building units and the latter are formed adjacent their upper edges to recenve a portion of the door or window and maintain it in proper position.

It is further contemplated that the model set of this invention will be found useful for educational purposes and afford the practical means for an interesting hobby.

Other details of construction and features of novelty contributing to the flexibility of the building set and its ease of use will appear from the following detailed description of a preferred embodiment taken with the accompanying drawings, in which:

Fig. 6 is a perspective view of one of the individual units to a somewhat larger scale.

Fig. 7 is an enlarged section taken along line 7—7 of Fig. 6;

Fig. 8 is a cross-section of a door clip taken along line 8—8 of Fig. 6; and

Fig. 9 is a perspective view of a roof detail element.

Figure 5:
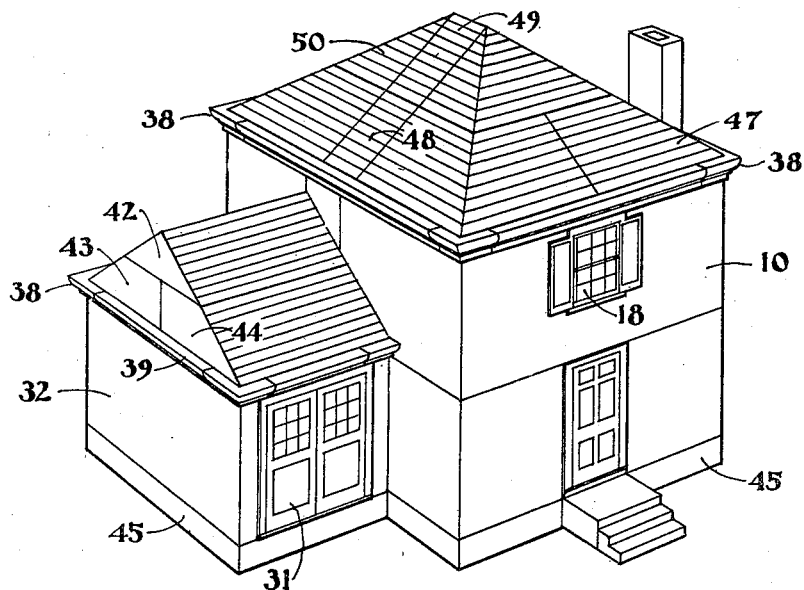
Fig. 5 is a perspective view of a complete assembled scale model, portions of which appear in the preceding figures.
Figure 1:
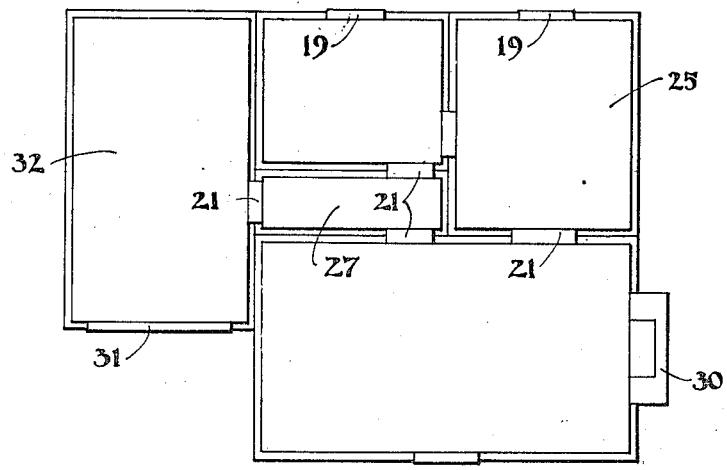
Fig. 1 is a plan view of one combination of basic units.
Figure 4:
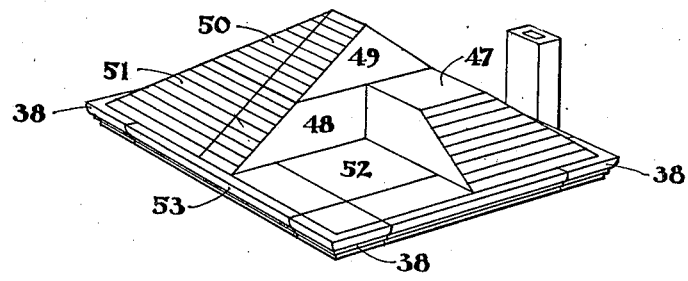
Fig. 4 is a perspective view of a roof for the house of the preceding figures with certain elements omitted.

The basic units of which a model is to be constructed are normally rectangular in outline and are built to any convenient architectural scale as ⅛" equals 1' 0", ¼" or ½" equals 1' 0" or the like. The smaller scales are cheaper, more convenient and rugged, but on the other hand, the larger scales permit of more detail and in general more nearly approach an accurate representation of the building or the like it is desired to lay out.

One important feature of the present invention is the interchangeability of the various unit parts. That is, the units representing a standard living room, kitchen or the like are so proportioned that they may be shifted around at will and placed in almost any conceivable relation to the other units and still fit and form a complete and in most instances a unified structure which satisfies the requirements of sound design.

The module chosen is twenty-one inches and is thought to be critical. This is taken as one-half the width of an average hall at passageway, plus the thickness of an average partition. All of the units are built in multiples of this module; of course, reduced to scale as mentioned above. By so proportioning the various units, it has been found that great flexibility is given thereto. It is this choice of a proper module which permits the interfitting of the various units and enables the untrained home planner to shift them around freely and obtain a relationship which will produce a satisfactory design. The exercise of relatively little care or planning sense will produce a most satisfactory combination of house units in a desirable relation with proper circulation from room to room. It will readily be seen that a device of this sort will make for maximum satisfaction on the part of home planners and enable them to obtain just what they want in the way of a home.

Referring first to Fig. 6, one of the units, 10, is seen to be rectangular, and may be constructed of wood, metal, transparent plastic or the like, although wood is preferred. As stated above, the adjacent sides 11 and 12 are multiples of the module twenty-one inches reduced to any desired architectural scale. The height or vertical edge 13 while likewise a multiple of the module is not so important and may be arbitrarily selected. Normally, it is constant for an entire set. It will be noted that the unit 10 has its opposite upper edges formed to provide recesses 14 and 15.

Windows and doors and the like are preferably formed of metal stampings 18 imprinted to simulate the accessory they are intended to represent. Plastic material may, of course, be used. Should the units 10 be made of transparent material, it would be desirable to imprint the stampings 18 on both sides so that some interior decorating may be carried out and a more complete representation of a dwelling interior obtained. The upper portion of stamping 18 is provided with a flange or lip 19 which is turned down as at 20 to mate with one of the recesses 14 or 15 in the upper edges of unit 10. This will hold the stampings 18 in place and permit positioning them anywhere along the walls or sides 11 and 12 of the unit 10. One way of obtaining the representation of interior doors between units, and thus establishing proper circulation, is by means of elements 21 which are wide enough to fit across the thicknesses of two of the walls of adjacent units and represent passageways therebetween. It will be seen that such construction gives an indication of both doors and windows on the plan as well as on the elevation of the structure, that is, flange 19 serves the double function of slidingly supporting stampings 18 and indicating the position of a door or window in the plan of the device when being studied directly from above or from a side opposite that on which the window or door is placed.

Further reference to Figs. 6 and 7 shows how the portions of the upper surfaces of the respective units outwardly of the recesses 14 and 15 are depressed to accommodate the thickness of the horizontal portions of flange 19 and element 21, thus to permit those horizontal portions to lie flush with the top surface of each unit.

Door frame elements or clips 21 may likewise be provided with thin depending flanges as at 22 to fit between corresponding adjacent units and into their respective edge recesses, in the manner indicated by Fig. 6.

Figure 2:
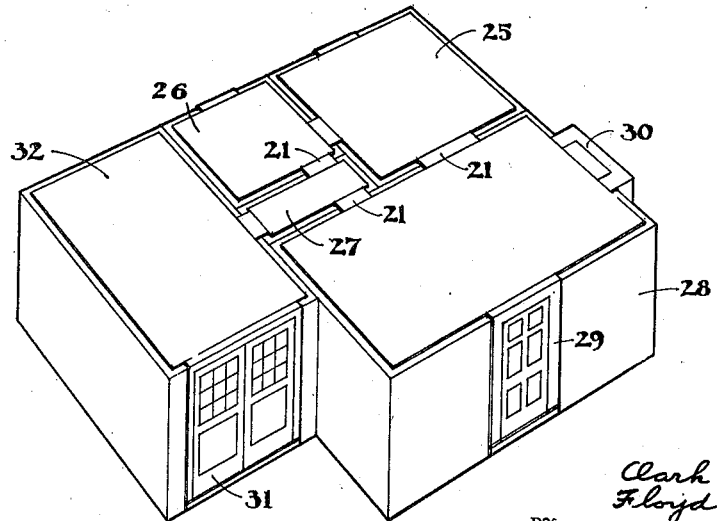
Fig. 2 is a perspective view of the first floor arrangement of Fig. 1.

The units are made up in various sizes to represent dining rooms, living rooms, bed rooms, kitchens, bath rooms, hallways, closets, garages and the like. As shown in Fig. 2, they will interfit in many relationships because their dimensions are multiples of the module. In addition to making the dimensions of the unit multiples of the module, some care is exercised so that in many cases the number of multiples add up to the same number. That is, as seen in Fig. 2, the multiples on the one side of units 25 and 26 are equal to those on one side of unit 28, while the multiples on one side of unit 26 and 27 are equal to those one one side of unit 25. This relationship contributes greatly to the flexibility and universality of the parts.

Fig. 2 shows clearly one combination representing a first floor plan. A door stamping 29 is supported by an upper edge of unit 28 representing a living room. A chimney portion 30 may be an entirely separate unit provided with an overhanging, horizontal flange corresponding to 19 of stamping 18. Stamping 31 represents garage doors on a garage unit 32.

By comparing dimensions, it will be seen that unit 26 may be placed in the offset between units 28 and 32. That is, the number of multiples of the module contained in unit 26 have been so selected that this result is obtainable.

Figure 3:
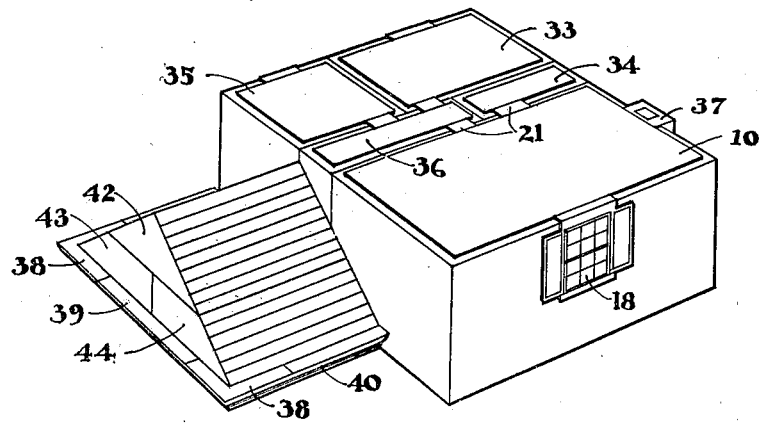
Fig. 3 is a perspective view of a possible unit combination for a second floor to combine with the first floor of Figs. 1 and 2.

A second story is shown in Fig. 3 wherein unit 10 is employed as the master bedroom. Additional units 33, 34, 35, and 36 constitute the upper floor. Stamping 18 represents a window as shown in Fig. 6, and surface 37 a horizontal continuation of chimney unit 30.

On the forward portion, a roof is shown extending over the garage below. This is made up of cornice portions 38, 39, and 40, which are made of the same material as unit 10 but are flat with moulded edges and have a shoulder 41 or angle recess (Fig. 9) which keeps the cornice aligned and in proper relation to the wall surface of the units below. The dimensions thereof are likewise multiples of the module as used with the units. The roof portion is made up of solid blocks 42, 43, and 44. These blocks are likewise in multiples of the module which makes possible the construction of roofs which will fit any dimension of the room units assembled below. All lateral faces of the roof blocks which are to form continuations are, of course, made to have the same slope.

Foundation blocks 45, also in multiples of the module, may be provided if desired. A layout of cross-section paper (not shown) may be used for plat representation beneath foundation blocks 45.

The main roof comprises solid block portions 47, 48, 49, 50, and 51, corresponding to block portions 42, 43, and 44, and interchangeable to construct most standard roof styles. These roof blocks are supported by filler strips 52 laid on top of the upper floor rooms. Cornice members 53, corresponding to members 39, are supplied in several lengths which are multiples of the module.

While certain forms of units and arrangement of parts have been specifically described, it is to be understood that the invention may be modified and embodied in other forms without departure from the spirit thereof or the scope of the appended claims.

Having thus described our invention, what we claim as novel and desire to secure by Letters Patent of the United States is:

1. A building set comprising a plurality of three-dimensional units each representative of a room space and the plan dimensions of which are selected multiples of the module twenty-one inches reduced to a desired scale for models of housing whereby wide flexibility in matching relationships is obtained.

2. The combination set forth in claim 1, said units having recessed upper edges whereby to receive and retain members representing building structural elements.

3. In the combination set forth in claim 1, a clip member having opposed spaced flanges formed and arranged to grip the upper edges of adjacent units and hold them in a desired relative position while simultaneously indicating a passageway therebetween.

4. The combination comprising a block unit having an upper surface representing the floor plan of a corresponding part of an architectural model, and an accessory representing an architectural detail viewable both in elevation and plan with respect to the block unit, said accessory being formed from a sheet-like material and having one portion simulative of the plan of a door or other wall partition opening overlying and extending parallel to the upper surface of the block unit and another portion partially covering and extending parallel to an adjacent exterior lateral surface of the block unit.

5. The combination set forth in claim 4 in which the block unit has a recess in its upper surface extending in parallel relation to an upper edge of the block unit, and the accessory is provided with a downward projection slidably engaging the recess.

6. The combination set forth in claim 4 in which the block unit has a recess parallel to and approximately coextensive with the periphery of its upper edge, and the portion of the accessory overlying the block unit is formed to slidably engage in a part of the recess.

7. The combination set forth in claim 4 in which the block unit has a recess parallel to and co-extensive with one of its upper edges, said recess being formed slidably to receive the overlying portion of the accessory in a position flush with the unrecessed part of the upper surface of the block unit.

8. In a building set comprising a plurality of three dimensional units, a rectangular block unit, and a cornice element having a downwardly extending gauging projecting means formed and arranged to rest complementally and laterally against an upper edge of the unit, whereby a finished roof may be provided and all cornice elements be aligned accurately.

9. In a building set comprising a plurality of three dimensional units, a block unit having an upper surface representing the floor plan of a corresponding part of an architectural model, and an accessory representing an architectural detail adapted to be viewed both in elevation and plan with respect to the block unit, said accessory having one portion simulative of a plan detail overlying and extending parallel to the upper surface of the block unit and another portion simulative of a wall elevation detail at right angles thereto partially covering and extending parallel to an adjacent lateral surface of the block unit.

CLARK N. TINGLEY.
FLOYD K. HARPER.